United States Patent
Koechner

[15] 3,662,281
[45] May 9, 1972

[54] METHOD AND MEANS FOR COMPENSATING BIREFRINGENCE IN LASER SYSTEMS

[72] Inventor: Walter Koechner, Malibu, Calif.
[73] Assignee: Union Carbide Corporation, New York, N.Y.
[22] Filed: Feb. 11, 1970
[21] Appl. No.: 10,513

[52] U.S. Cl. ............................................................ 331/94.5
[51] Int. Cl. ...................................................... H01s 3/00
[58] Field of Search ............................................ 331/94.5

[56] References Cited
UNITED STATES PATENTS 3,484,714  12/1969  Koester et al. .................... 331/94.5

*Primary Examiner*—Ronald L. Wibert
*Assistant Examiner*—Conrad Clark
*Attorney*—Pastoriza & Kelly

[57] ABSTRACT

Birefringence induced by nonuniform heating in a laser rod is compensated for by introducing a compensating material of similar physical properties to the rod and artificially inducing birefringence in the compensating material in a sense opposite to that taking place in the laser rod.

7 Claims, 7 Drawing Figures

PATENTED MAY 9 1972  3,662,281

*INVENTOR.*
WALTER KOECHNER
BY *Pastoriza & Kelly*
ATTORNEYS

METHOD AND MEANS FOR COMPENSATING BIREFRINGENCE IN LASER SYSTEMS

This invention relates to laser systems and more particularly to a method and means for compensating birefringence induced by thermal stresses in a laser rod.

BACKGROUND OF THE INVENTION

Birefringence, or the splitting of a beam of incident light into two components which travel at different velocities, often is present in optical devices subject to nonuniform stress. Solid state laser materials such as rods operating in either the steady state or continuous wave mode of operation must dissipate an appreciable amount of heat. In cylindrical geometries which are most commonly used, the heat is removed from the circumferential surface of the cylinder thereby generating a radial thermal gradient. The varying temperature within the laser rod generates nonuniform stress which in turn induces birefringence.

There are a large number of laser systems in which a linear polarized beam is required. For example, systems utilizing electro-optical Q switching, acousto-optical modulation, and frequency doubling all require a linear polarized beam. Birefringence severely decreases the output power from such a laser whose beam has to be linearly polarized.

BRIEF DESCRIPTION OF THE PRESENT INVENTION

In accord with the method and means of the present invention, birefringence induced by thermal stress in a laser material is compensated for by introducing a compensating material of physical properties similar to that of the laser material in optical alignment with the laser material. This compensating material is then artificially heated to thermally induce artificial stress in the material in a sense opposite to thermal stress developed in the laser material. The degree of heating is changed until the birefringence artificially induced in the compensating material substantially cancels the birefringence induced by thermal stress in the laser material.

BRIEF DESCRIPTION OF THE DRAWINGS

A better understanding of the invention will be had by referring to the accompanying drawings in which.

DETAILED DESCRIPTION OF THE INVENTION

Figure 1:
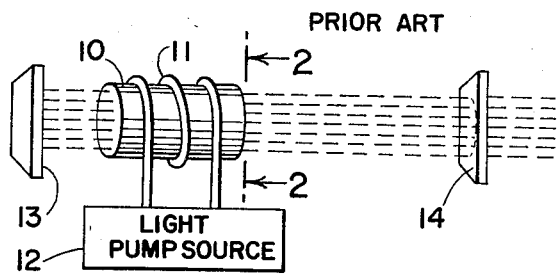
FIG. 1 is a schematic illustration of a prior art solid state laser system with which the present invention may be used.

Referring to FIG. 1 there is shown a laser material in the form of a rod 10 surrounded by an helical flashlamp 11 powered from a light pump source 12. End mirrors 13 and 14 in optical alignment with the rod 10 define an optical cavity for the laser. Light pumping of the rod 10 by the flashlamp 11 builds up an inverted population level of the laser ions in the rod and at threshold, the laser ions in the upper energy level fall back to a lower level resulting in stimulated emission of radiation which is enhanced through regenerative action taking place between the end mirrors 13 and 14. The end mirror 14 may be partially transmissive in order to couple the beam out of the optical cavity.

Normally, the laser rod 10 and helical flashlamp 11 are surrounded by an enclosure or "head" through which cooling liquid is circulated. Cooling of the rod 10 is thus effected essentially at the cylindrical surface and a temperature gradient is developed in the rod from the center towards the periphery.

Figure 2:
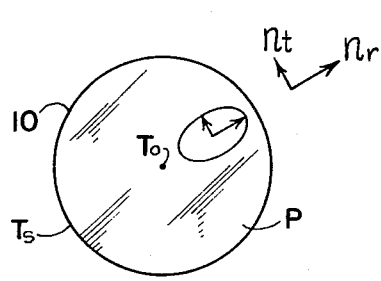
FIG. 2 is an end view in the direction of the arrows 2—2 of the laser material utilized in FIG. 1 illustrating birefringence induced in the material.

With particular reference to FIG. 2, the temperature of the rod 10 at its center is designated $T_o$ and is substantially greater than the temperature of the rod designated $T_s$ at its surface. This temperature gradient generates thermal stress such that the center of the rod is essentially under compression and the surface under tension.

A light beam incident at a point P is broken up into two rays, polarized in radial and tangential directions respectively. The refractive indexes, respectively designated $n_r$ and $n_t$, are different in both directions. In the case of a neodymium doped YAG laser rod, the refractive index for the radial component of the polarized light is larger than for the tangential component. This relationship is illustrated by the index ellipse shown in FIG. 2.

Figure 3:
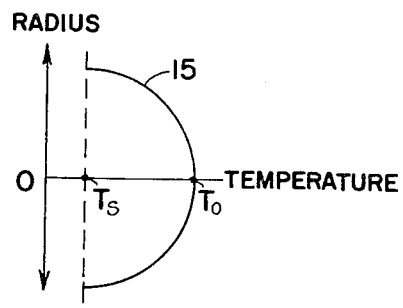
FIG. 3 is a qualitative plot of temperature at different radial distances within the laser material of FIG. 2.

FIG. 3 illustrates at 15 the variation in temperature described for the laser material 10 of FIG. 2. It will be noted that the temperature is maximum at the center of the rod and decreases with increasing radius towards the periphery.

In accord with the method and means of the present invention, there is introduced into the laser cavity of FIG. 1 a compensating material which has physical properties similar to the laser material; for example, a radial symmetry which is the same as the laser rod but in which for the particular example illustrated there is induced a refractive index for the tangential component which is larger than that for the radial component.

By providing such a compensating material in optical alignment with the laser rod in accord with the method of the invention, birefringence developed in the laser rod is essentially canceled by the artificially induced birefringence in the compensating material.

Figure 4:
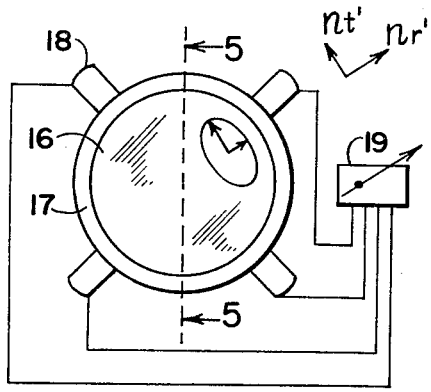
FIG. 4 is a diagrammatic front view of a compensating system for compensating the birefringence described in FIGS. 2 and 3.

Referring to FIG. 4, there is illustrated one practical means of effecting the above-described compensation. As shown, the compensating material is in the form of a disc 16 of diameter at least equal to that of the laser rod 10 of FIG. 2. This disc has similar physical properties to that of the laser rod and, for example, in the case of a YAG laser, the disc 16 itself would preferably consitute undoped YAG.

As shown in FIG. 4, a ring of metal 17 surrounds the periphery of the disc and is in intimate thermal contact therewith. Mounted on the ring 17 are electrical heating elements such as indicated at 18. The degree of heat applied by these elements may be adjusted or changed by a suitable control means such as an electrical control designated by the box 19 which varies the current supplied to the heating elements.

Figures 5, 6:
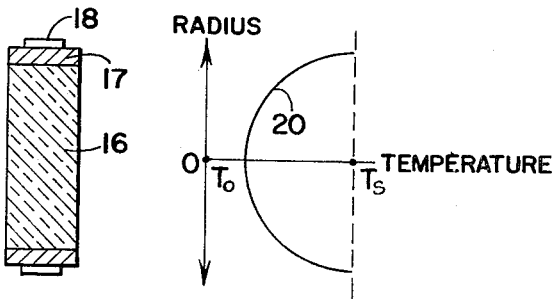
FIG. 5 is a cross section taken in the direction of the arrows 5—5 of FIG. 4.
FIG. 6 illustrates the temperature at different radial distances within the compensating material of FIGS. 4 and 5.

FIG. 5 depicts the arrangement of the disc, metallic ring, and heating elements in cross section.

With the foregoing arrangement, the application of heat to the elements will heat the ring and thus induce a temperature gradient in the disc material 16 wherein the temperature at the outer surface is maximum and the temperature at the center minimum. This type of thermal gradient is illustrated in FIG. 6 at 20 wherein it will be noted that the temperature increases from the center radially outwardly. The index ellipse is shown in FIG. 4 wherein the tangential component $n_t'$ is now larger than the radial component $n_r'$.

Figure 7:
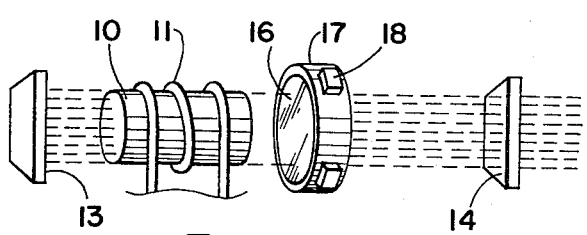
FIG. 7 is a diagrammatic showing of the laser system of FIG. 1 incorporating the compensating system of FIGS. 4 and 5.

FIG. 7 illustrates the compensating disc and associated components within the laser cavity of the system of FIG. 1 wherein the same reference numerals have been used.

OPERATION

The operation of the compensation means will be evident from the foregoing description. In the case of any particular solid state laser rod, the compensating disc is preferably formed of a material corresponding to the host crystal material of the laser. For example, such material may constitute glass, or in the case of a YAG rod, undoped yttrium-aluminum garnet.

The disc is disposed in the optical cavity in alignment with the laser rod as illustrated in FIG. 7 and heat is then applied to the peripheral ring 17 by controlling the current supplied to the heating elements 18 from the control 19.

In the particular example set forth, the artificial thermal gradient induced in the compensating disc extends from the periphery towards the center which is opposite in sense to the thermal gradient developed in the laser rod when peripheral cooling is employed. Artificial thermal stresses are thus established in the compensating disc which in turn induce a birefringence in the disc.

With the compensating disc in the optical cavity, the degree of heat applied to the compensating disc may be varied during operation of the laser to change the thermal stress and thus artificially induce birefringence until cancellation of the birefringence in the laser material occurs.

It will be understood that the output from many different laser rods is already in the form of linear polarized light. In other systems there would be provided a polarizing plate in the optical cavity of the system of FIG. 7 to provide linear polarized light for electro-optical Q switching or other operations requiring a polarized beam.

By cancelling the birefringence for such linear polarized light, increased power output is realizable over that obtainable in the absence of the compensating material.

I claim:

1. A method of compensating birefringence induced by thermal stress in a laser material, comprising the steps of:
   a. introducing a compensating material of physical properties similar to that of said laser material in optical alignment with said laser material;
   b. artificially heating said compensating material to thermally induce artificial stress in said material in a sense opposite to thermal stress developed in said laser material; and
   c. changing the degree of heating of said compensating material until the birefringence artificially induced by said artificial stress substantially cancels the birefringence induced by thermal stress in said laser material.

2. Means for compensating birefringence induced by thermal stress in a laser material, comprising:
   a. compensating material of physical properties similar to that of said laser material;
   b. heating means for applying heat to said compensating material at points to establish thermal gradients in said material in directions to induce artificial stress in a sense opposite to thermal stress developed in said laser material; and
   c. means for changing the heat applied by said heating means until the birefringence artificially induced by said artificial thermal stress cancels the birefringence induced by thermal stress in said laser material when said compensating material is disposed within an optical cavity incorporating said laser material and is in optical alignment with said laser material whereby increased power output from said laser material is provided over that obtained in the absence of said compensating material.

3. The subject matter of claim 2, in which said compensating material is in the form of a disc member, said heating means including a thermally conducting ring of metal in intimate thermally conductive contact with the periphery of said disc member; and electrical heating elements mounted on said ring for heating said ring to thereby establish radial inwardly directed thermal gradients; and in which said means for changing the heat applied includes electrical control means connected to said electrical heating elements for varying the current supplied thereto.

4. A laser system comprising, in combination:
   a. a laser material;
   b. light pumping means for inducing an inverted population level of laser ions in said material;
   c. first and second end mirrors positioned in optical alignment with said material to define an optical cavity;
   d. a compensating material of physical properties similar to that of said laser material disposed in said optical cavity in optical alignment with said laser material;
   e. artificial heating means connected to said compensating material at positions to establish thermal gradients in said compensating material in directions to induce artificial thermal stress in a sense opposite to thermal stress developed in said laser material by said light pumping means; and
   f. control means connected to said heating means for changing the degree of heat and thereby the birefringence induced by said artificial thermal stress in said compensating material until it substantially cancels the thermally induced birefringence in said laser material.

5. A system according to claim 4, in which said laser material comprises a solid state rod of given diameter, said compensating material being in the form of a disc member of diameter at least equal to said given diameter, said heating means including a thermally conducting ring of metal in intimate thermally conductive contact with the periphery of said disc member; and electrical heating elements mounted on said ring for heating said ring to thereby establish radial inward directions for said thermal gradients; and in which said control means includes electrical means connected to said electrical heating elements for varying the current supplied thereto.

6. A system according to claim 5, in which said disc material comprises glass.

7. A system according to claim 5, in which said rod comprises a yttrium-aluminum-garnet host crystal doped with neodymium ions and in which said disc member comprises undoped yttrium-aluminum-garnet.

* * * * *